United States Patent [19]
Bergmann

[11] Patent Number: 5,709,339
[45] Date of Patent: Jan. 20, 1998

[54] SANITARY MIXING FAUCET WITH THERMOSTAT CONTROL

[75] Inventor: Konrad Bergmann, Wittlich, Germany

[73] Assignee: Ideal-Standard GmbH, Bonn, Germany

[21] Appl. No.: 553,261

[22] PCT Filed: May 11, 1994

[86] PCT No.: PCT/EP94/01329

§ 371 Date: Nov. 13, 1995

§ 102(e) Date: Nov. 13, 1995

[87] PCT Pub. No.: WO94/26989

PCT Pub. Date: Nov. 24, 1994

[30] Foreign Application Priority Data

May 12, 1993 [DE] Germany .......... 43 15 702.5
Jul. 22, 1993 [DE] Germany .......... 43 24 547.1

[51] Int. Cl.[6] .......................... G05D 23/13
[52] U.S. Cl. ................................ 236/12.2
[58] Field of Search .............. 236/12.2, 12.21

[56] References Cited

U.S. PATENT DOCUMENTS

| | | | |
|---|---|---|---|
| 4,029,256 | 6/1977 | Dauga | 236/12.2 |
| 4,166,575 | 9/1979 | Sassi | 236/12.21 |
| 4,607,788 | 8/1986 | Bendall et al. | 236/12.21 |
| 5,370,305 | 12/1994 | Schneider | 236/12.2 |

FOREIGN PATENT DOCUMENTS 36 12 988 10/1987 Germany .
WO 79/00313 6/1979 WIPO .

Primary Examiner—William E. Tapolcai
Attorney, Agent, or Firm—Sixbey, Friedman, Leedom & Ferguson; David S. Safran

[57] ABSTRACT

A thermostat-regulated sanitary mixing tap has a cold water inlet (1), a hot water inlet (2), a mixed water outlet, a temperature control and regulation block (5), a control and regulation piston (6), temperature-dependent regulating means (7) which cooperate with the control and regulation piston (6), an actuating lever, restoring spring means (35) which bias the control and regulation piston (6) in the direction of the regulating means (7), a cold water ring-shaped chamber (15) and an adjacent hot water ring-shaped chamber (16). To control the temperature, the control and regulation piston (6) may be set at an initial position with respect to the temperature control and regulation block (5), in order to determine the initial temperature, and may be controlled by the regulating means (7) in order to regulate the temperature. In order to prevent the temperature of the mixed water from being affected by any leakage currents from the cold water (15) and/or hot water (16) ring-shaped chambers and to achieve a control and/or regulation which is as free as possible from such influences, at least one ring-shaped sealing membrane (16) provided between the temperature control and regulation block (5) and the control and regulation piston (6) insulates the cold water ring-shaped chamber (15) from the hot water ring-shaped chamber (16) or insulates the cold water (15) and/or the hot water (16) ring-shaped chambers from the outside.

16 Claims, 6 Drawing Sheets

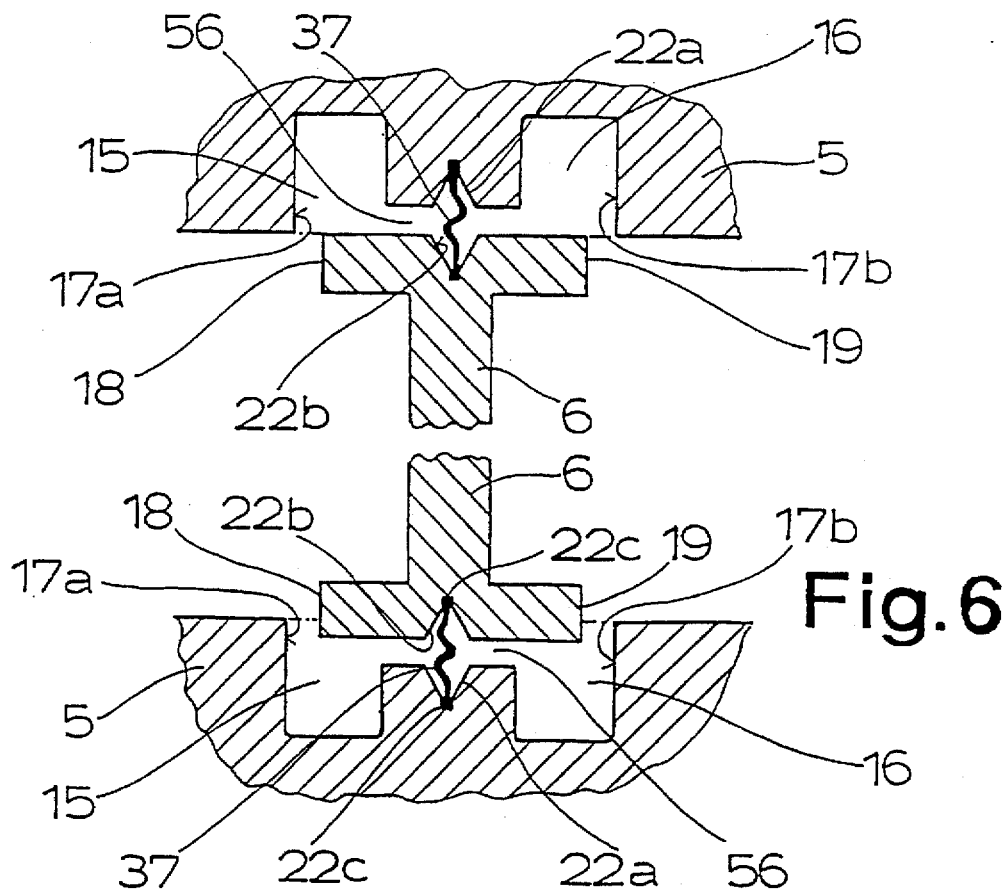
Fig. 6
Fig. 7
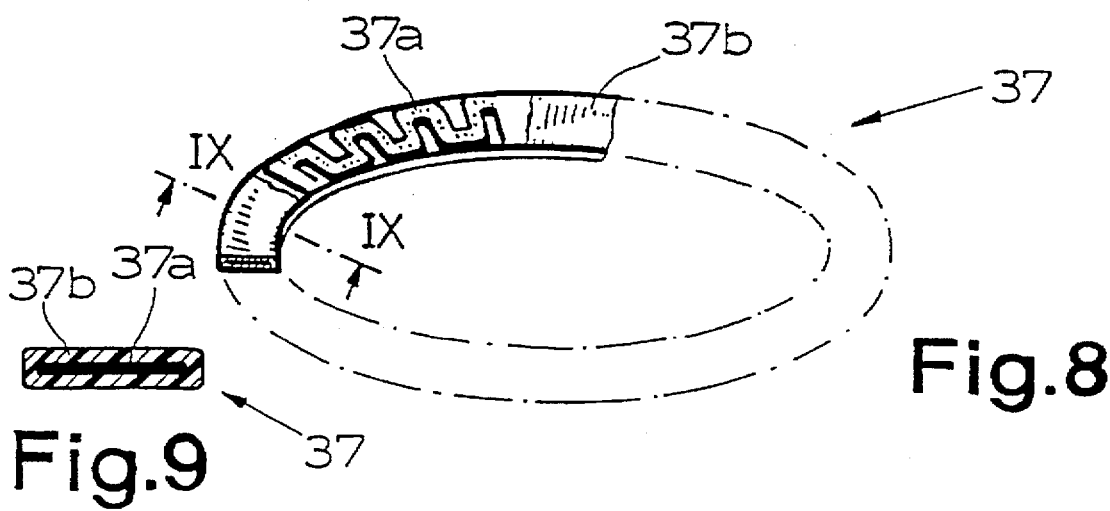
Fig. 8
Fig. 9

SANITARY MIXING FAUCET WITH THERMOSTAT CONTROL

BACKGROUND OF THE INVENTION

1. Field of the Invention

The invention relates to a sanitary mixing faucet with thermostat control, with a cold water supply, a hot water supply, and a mixed water discharge, with a means preferably a temperature control block which radially surrounds a control piston, with a temperature-dependent control element which interacts with the control piston, with an actuating lever and with a reset spring element which loads the control piston in the direction to the control element, a cold water annulus and an adjacent hot water annulus being provided and the control piston being adjustable for temperature control relative to the temperature control block into a temperature-determining neutral position and being controllable for temperature control by means of the control element. Furthermore, the invention relates to a thermostat valve with a control piston, with a means preferably a temperature control block which radially surrounds the control piston, with a temperature-dependent control element which interacts with the control piston, with an actuating element and with a reset spring element which loads the control piston in the direction to the control element, the control piston being adjustable for temperature control relative to the means into a temperature-determining neutral position and being controllable for temperature control by means of the control element.

2. Description of Related Art

While the sanitary mixing faucet on which the invention is based is known for example from DE-A-41 20 024, the thermostat valve on which the invention is likewise based has been known in and of itself for years in general in the sanitary and heating domain.

The known sanitary mixing faucet on which the invention is based is further provided with a stationary valve face disc or washer, with a valve disc or washer which can move on the valve face washer for quantitative control, with a temperature control block which interacts with the valve washer for temperature control, the temperature control block representing a means which surrounds the control piston. In particular, in the thermostat valve on which the invention is based the temperature control block can be designed as the means surrounding the control piston and also as part of the thermostat valve housing.

Further, sanitary mixing faucets of the type under consideration here also include an actuating lever which is accessible from the outside and a control lever which is connected to the actuating lever so that it is possible to intervene in the interior of the sanitary mixing faucet for control purposes via the externally accessible actuating lever and the control lever connected to it.

For sanitary mixing faucets of the type under consideration here it generally holds that the valve face washer has a cold water inlet opening which is connected to the cold water supply and a hot water inlet opening which is connected to the hot water supply, that in the valve washer there are openings which communicate with the cold water inlet opening of the valve face washer and the hot water inlet opening of the valve face washer, and that the temperature control block has cold and hot water inlet openings which communicate with the openings of the valve face washer as well as a cold water annulus and a hot water annulus. Between the temperature control block, i.e., between the cold water annulus and hot water annulus, is a control and stop collar, the control piston being made sleeve-shaped and having a cold water control edge and a hot water control edge with a distance to the cold water control edge and the control and stop collar having a width which is less than the distance between the cold water control edge and the hot water control edge, and projecting into the intermediate space between the cold water control edge and the hot water control edge.

In the known sanitary mixing faucets described above, on which the invention is based, between the temperature control block and the control piston are only weakly prestressed or non-prestressed O-rings which are held in the corresponding grooves of the temperature control block. This type of seal between the temperature control block and the control piston is based on the idea that a one-hundred percent seal is not necessary at these points if there is already a sufficient seal between the valve face washer and the valve washer on the one hand and the temperature control block and the valve washer on the other.

In the known mixing faucet, due to its structure as a single lever mixing faucet the mount and temperature can be easily adjusted. Furthermore, relatively good temperature control is also possible due to the control piston which can move easily within the temperature control block. Overall this mixing faucet represents a relatively satisfactory solution. However, it has been ascertained that due to the insufficient seal between the temperature control block and the control piston, leaks, even if small, can occur from the cold water annulus on the one hand and on the hot water annulus on the other; but this is undesirable since in this way the effect which may be caused by the temperature control or the adjusted and/or regulated mixing temperature can be adversely influenced.

From DE-A-36 12 988 another mixing faucet is known which operates similarly to the generic mixing faucet. In this case however there is no control and stop collar between the hot water annulus and the cold water annulus. In this mixing faucet the control piston is likewise made sleeve-shaped, the distance between the cold water control edge and the hot water control edge being greater than the longitudinal extension of the control piston so that the latter moves between the two control edges for control of the mixed water temperature, thus changing the supply gap of the cold water and hot water in opposite directions in cross section. However the distance between the cold water control edge and the hot water control edge can be less than the longitudinal extension of the control piston. Here the control piston overlaps the two control edges and likewise moves back and forth, thus changing the supply gap of the cold water and hot water in opposite directions in cross section to control the mixed water temperature. In both cases the cold water annulus and the hot water annulus are sealed via O-rings. If in this case the sealing effect by the O-rings is high, there are little or no leaks from the cold water annulus to the hot water annulus and vice versa, however the control piston reacts then only to greater temperature fluctuations since in smaller temperature fluctuations only smaller control forces are generated by the control element and they cannot overcome the friction force produced by the O-rings. If conversely there is only a weak seal, undesirable mixing of hot and cold water can occur. The aforementioned disadvantages of course also apply to thermostat valves which operate according to the aforementioned control process.

One requirement to be imposed on all sanitary mixing faucets consists essentially in producing them as small as possible. Although the generic mixing faucet compared to the mixing faucets currently on the market already satisfies the highest demands for dimensions and construction height, new designs are being continually sought to further reduce the dimensions of mixing faucets. Of course this requirement also applies to thermostat valves which are used in mixing faucets, but also for themselves.

Therefore the object of the invention is to make available a mixing faucet and a thermostat valve of the type mentioned initially, in which the adjusted and/or controlled mixed water temperature is not influenced by leaks. At the same time the mixing faucet and the thermostat valve should be structurally simple and as small as possible to install.

The aforementioned object is achieved in the mixing faucet described initially according to the first inventive idea essentially by the fact that there is at least one annular membrane seal between the temperature control block and the control piston and the membrane seal seals to the outside either between the cold water annulus and the hot water annulus each. In this first embodiment of the invention, according to a first alternative, leaks from the cold water annulus to the hot water annulus and vice versa are prevented, while according to a second alternative leaks to the outside are prevented which can likewise adversely affect the adjusted and/or controlled mixed water temperature. However the advantage of the two alternatives consists definitively in that now on the one hand a good seal between the temperature control block and the control piston is possible, while on the other hand the control piston can be pushed easily back and forth relative to the means. Compared to the seal with O-rings used to date the membrane seal produces no frictional force since it can follow the motion of the control piston in the temperature control block without friction. Therefore, in the invention, better than in the past, even the smallest temperature fluctuations can be very quickly corrected since friction no longer needs to be overcome and the control piston reacts immediately to a change in the length of the control element. According to the invention this leads to only very small temperature forces being required for temperature-controlling displacement of the control piston relative to the temperature control block and they can be produced by the control element even with small temperature fluctuations.

To achieve the object underlying the invention it is provided in a second embodiment according to the invention that the reset spring element is located between the temperature control block and the control piston and on the one hand is supported on the temperature control block, preferably on its inner jacket, and on the other hand on the outer jacket of the control piston. Instead of the known axial arrangement of the reset spring element which in the prior art acts on an axial front face within the control piston, the reset spring element is now arranged surrounding the control piston on the outside. In other words, this means that the reset spring element is located within the longitudinal extension of the control piston and need no longer project above it in the longitudinal direction or the direction of movement to be supported. The advantage of this new arrangement consists in that the width of the mixing faucet according to the invention compared to the known mixing faucet can be further reduced since the reset spring element is now directly supported on the temperature control block so that the formation of a separate support flange for the reset spring element, as is conventional in the prior art, is no longer necessary. These advantages of course also arise in a thermostat valve according to the invention which functions according to the same principle as the sanitary mixing faucet according to the invention. Here as well a reduction of the dimensions is possible by the arrangement according to the invention by changing the known configuration of the reset spring element which is supported, as is conventional in the prior art, on the thermostat housing or on a cover.

It is especially advantageous if these two solutions according to the invention are implemented in a sanitary mixing faucet or a thermostat valve. A mixing faucet of this type and thermostat valve of this type have not only extremely small dimensions, but the set mixing temperature is always achieved without it having been adversely affected by any leaks.

To reduce the individual parts of a mixing faucet according to the invention or a thermostat valve according to the invention and to simplify the structure it offers special advantages if the reset spring element simultaneously seals between the temperature control block and control piston in addition to its reset function. This means that additional seals can be saved by the dual function of the reset spring element. The sealing action by the reset spring element can then be especially easily accomplished if the reset spring element is designed as a disk spring and regardless of the position of the control piston always acts at least with low prestress between the temperature control block and the control piston.

With respect to other possibilities for configuring and developing the sanitary mixing faucets and thermostat valves according to the invention, reference is made first to the additional patent claims. Otherwise, in the following the invention and embodiments and developments of the invention are explained using a drawing which describes simply embodiments. In doing so all the described and/or depicted features for themselves or in any combination form the subject matter of this invention;

BRIEF DESCRIPTION OF THE DRAWINGS

FIG. 6 shows a cut out view of another embodiment of a mixing faucet or a thermostat valve according to the invention, FIG. 7 shows a perspective view of the reset spring element shown in FIG. 6 and FIGS. 8 and 9 show views of another reset spring element in an overhead view, partially cut away (FIG. 8) and in cross section (FIG. 9) along cut line IX—IX from FIG. 8.

DETAILED DESCRIPTION OF THE PREFERRED EMBODIMENT

The sanitary mixing faucets shown only partially in FIGS. 1, 2, 4 and 5 are each so-called individual thermostats, i.e. quantitative control on the one hand and temperature control on the other take place at the consumption point.

Figure 1:
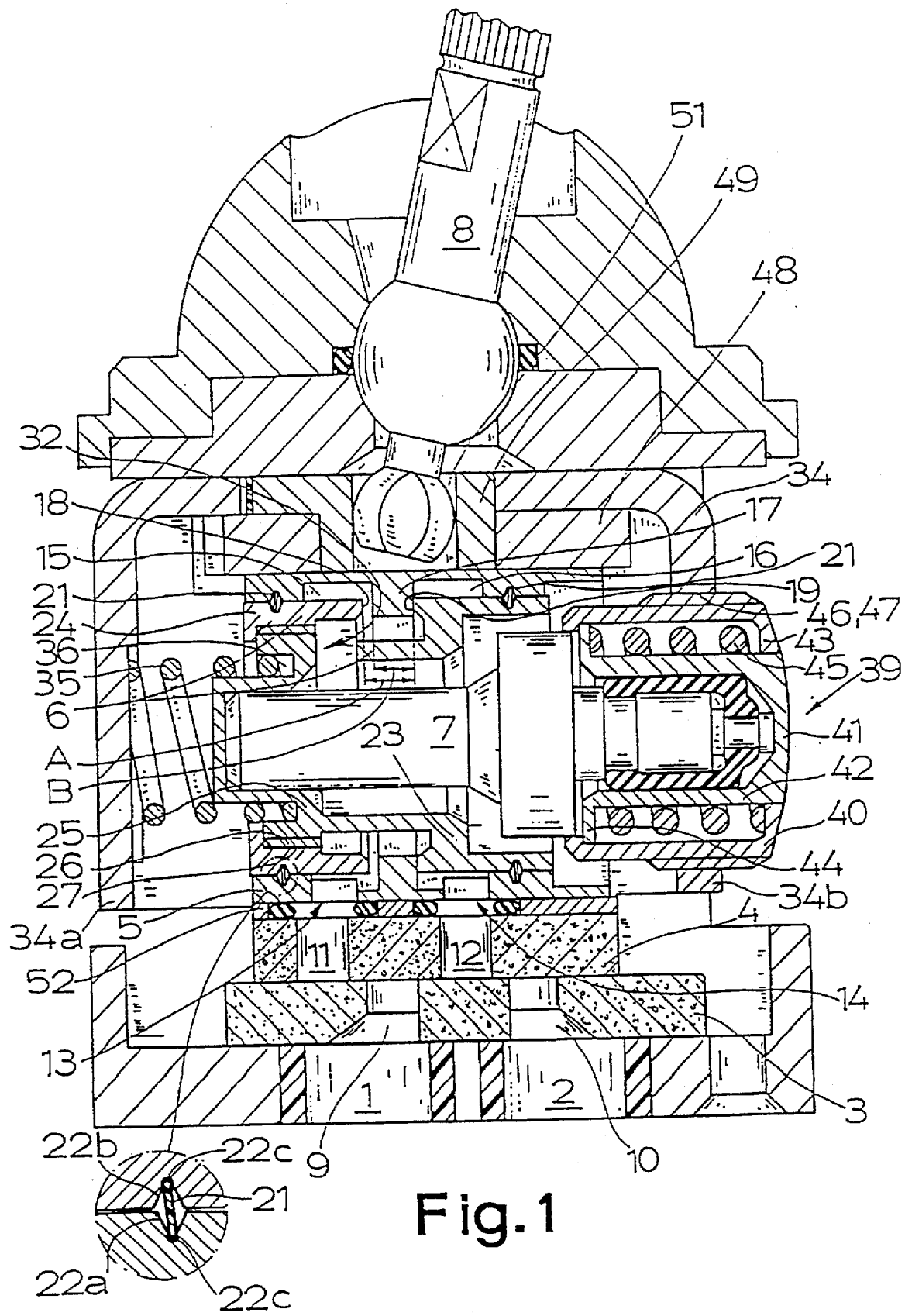
FIGS. 1 and 2 show longitudinal sections through the most important function parts of a first and a second embodiment of a sanitary mixing faucet according to the invention with thermostat control.
Figure 2:
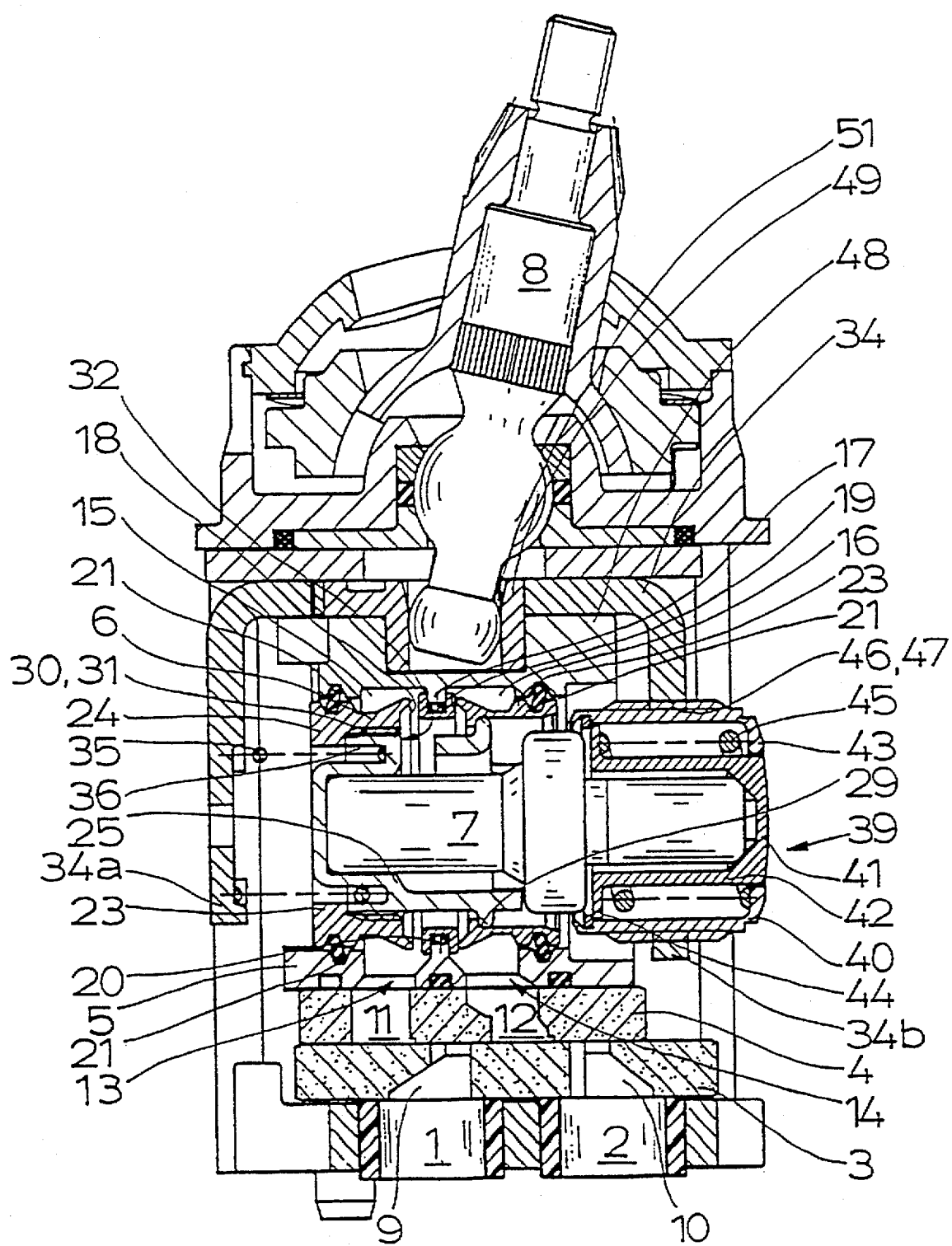
Figure 4:
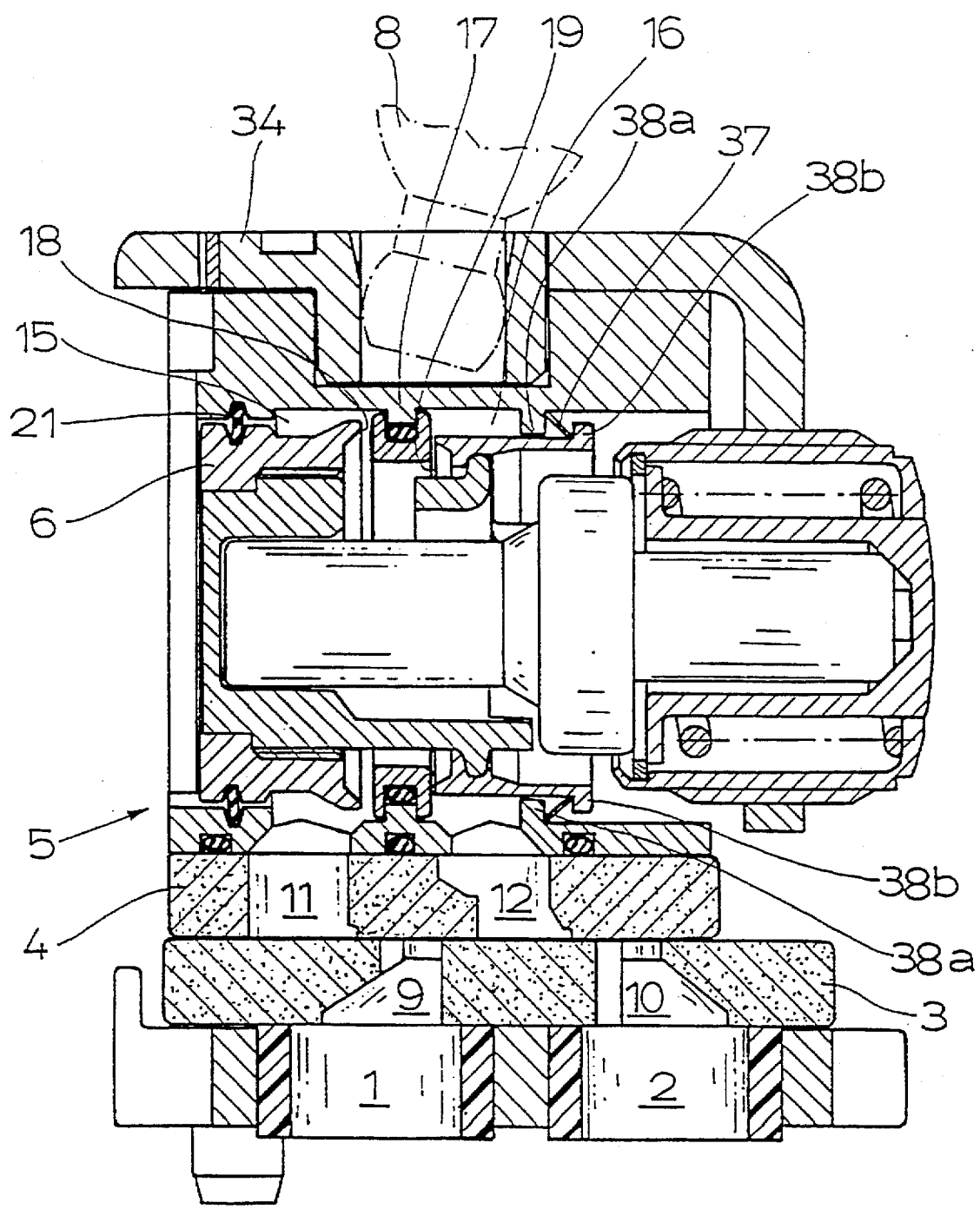

The sanitary mixing faucets shown only partially in FIGS. 1, 2, 4 and with thermostat control each include first of all cold water supply 1, hot water supply 2, and a mixed water discharge which is not shown. Viewed in the flow direction a stationary valve face disc or washer 3, valve disc or washer 4 which can move on valve face washer 3 for quantitative control, and temperature control block 5 which interacts with valve washer 4 for quantitative control follow cold water supply 1 and hot water supply 2. Furthermore, the sanitary mixing faucets according to the invention include the control piston 6 which is provided in temperature control block 5, temperature control block 5 being formed as a means which radially surrounds control piston 6, temperature-dependent control element 7 which interacts with control piston 6, an actuation lever which is not shown, and control lever 8 which is indicated by a dotted line in FIG. 4 and which is joined to the actuating lever which is not shown.

As FIGS. 1, 2 and 4 show, valve face washer 3 has cold water inlet opening 9 connected to cold water inlet 1 and hot water inlet opening 10 connected to hot water inlet 2. As FIGS. 1, 2, 4 and 5 show, in valve washer 4 are openings 11, 12 which communicate with cold water inlet opening 9 of valve face washer 3 and hot water inlet opening 10 of valve face washer 3. Temperature control block 5 has cold water and hot water inlet openings 13, 14 which communicate with openings 11, 12 of valve washer 4, as well as cold water annulus 15 and hot water annulus 16. Control piston 6 can be set for temperature control relative to temperature control block 5 into a temperature-determining neutral position and can be controlled for temperature control by means of control element 7.

As FIGS. 1, 2, 4 and 5 show, temperature control block 5 between cold water annulus 15 and hot water annulus 16 has control and stop collar 17. Control piston 6 is made sleeve-shaped and has cold water control edge 18 and hot water control edge 19 with distance A to cold water control edge 18. Control and stop collar 17 has width B which is less than the distance between cold water control edge 18 and hot water control edge 19, and projects into the intermediate space between cold water control edge 18 and hot water control edge 19.

Instead of the above described embodiment with a control and stop collar, the invention can also be used in sanitary mixing faucets in which there is no control and stop collar between the cold water annulus and the hot water annulus. In this embodiment the control piston is likewise preferably, but not necessarily, made sleeve-shaped. In one of these embodiments the distance between the cold water control edge and the hot water control edge is greater than the longitudinal extension of the control piston so that the latter moves between the two control edges for control of the mixed water temperature, thus changing the supply rate for cold water and hot water in opposite directions in cross section. An embodiment of this type is known from the initially mentioned DE-A-36 12 988. In another embodiment the distance between the cold water control edge and the hot water control edge is smaller than the longitudinal extension of the control piston so that it moves back and forth for control of the mixed water temperature, thus changing the supply gap for cold water and hot water likewise in opposite directions in cross section and overlapping the two control edges to the outside.

In both cases neither the cold water annulus and the hot water annulus, as detailed as in the following for the embodiments described, are sealed each to the outside, but sealing takes place between the two annuli in the manner detailed in the following.

In the embodiment of a sanitary mixing faucet according to the invention shown in FIG. 1 temperature control block 5 consists of copper or brass, preferably brass. Conversely, temperature control block 5 in the embodiments of FIGS. 2, 4 and 5 can consist of plastic. When plastic is used, control and stop collar 17 is then provided with reinforcement 20 of harder material, preferably copper or brass, preferably brass. It goes without saying that temperature control block 5 of the embodiments shown in FIGS. 2, 4, and 5 can also consist entirely of copper or brass, preferably of brass; this can be a special advantage in the embodiments shown in FIGS. 4 and 5.

Since control piston 6 should be relatively easy to move within temperature control block 5 in order to be able to respond to even the smallest temperature changes, the inside diameter of temperature control block 5 assigned to control piston 6 is greater, preferably by roughly 0.3 mm, than the corresponding outside diameter of control piston 6.

In the embodiments according to FIGS. 1 and 2, between temperature control block 5 and control piston 6 for sealing cold water annulus 15 and adjacent hot water annulus 16, there are one annular membrane seal 21 each to the outside. Membrane seals 21 are used not only to seal cold water annulus 15 and hot water annulus 16 to the outside, but also to guide control piston 6 in temperature control block 5. Each membrane seal 21 is fixed with its outer edge in outer groove 22a and with its inner edge in inner groove 22b. Outer groove 22a is thus formed in temperature control block 5, while inner groove 22b is realized on control piston 6. This is easily apparent from the enlarged detail description in FIG. 1. In the embodiment shown in FIG. 1, outer grooves 22a and inner grooves 22b are each made V-shaped and are each provided with recess 22c in the groove base which is used for attachment or secure holding of membrane seal 21 in grooves 22a and 22b. Formation of a recess has been abandoned in the embodiment according to FIG. 2. In this case membrane seal 21 can be pressed against the groove base of outer groove 22a and inner groove 22b and seals in this way. By replacing the O-rings used in the prior art by membrane seal 21 according to the invention, friction-free temperature control is now possible with an outstanding seal, i.e., the discharging mixing water is not subject to temperature fluctuations due to any leaks.

In the embodiments which are not shown, in which the control edges are either outside the longitudinal extension of the control piston or in the area of the control piston, however in neither case there being a control and stop collar, the cold water and hot water annulus are sealed against one another via the membrane seal according to the invention. In this case then only one membrane seal is necessary. Accordingly there is also only one external groove in the temperature control block and one inner groove in the control piston for holding the membrane seal attachment. The membrane seal thus prevents undesirable mixing of the hot and cold water from the respective annuli.

In the advantageous embodiment of a sanitary mixing faucet according to the invention shown in FIG. 1 control piston 6 consists of first piston part 23 and second piston part 24. In this case first piston part 23 has connecting part 25 which projects into second piston part 24 with outer thread 26, second piston part 24 being provided with inner thread 27 and two piston parts 23, 24 being screwed together. Two piston parts 23, 24 consist of copper or brass, preferably of brass.

Figure 5:
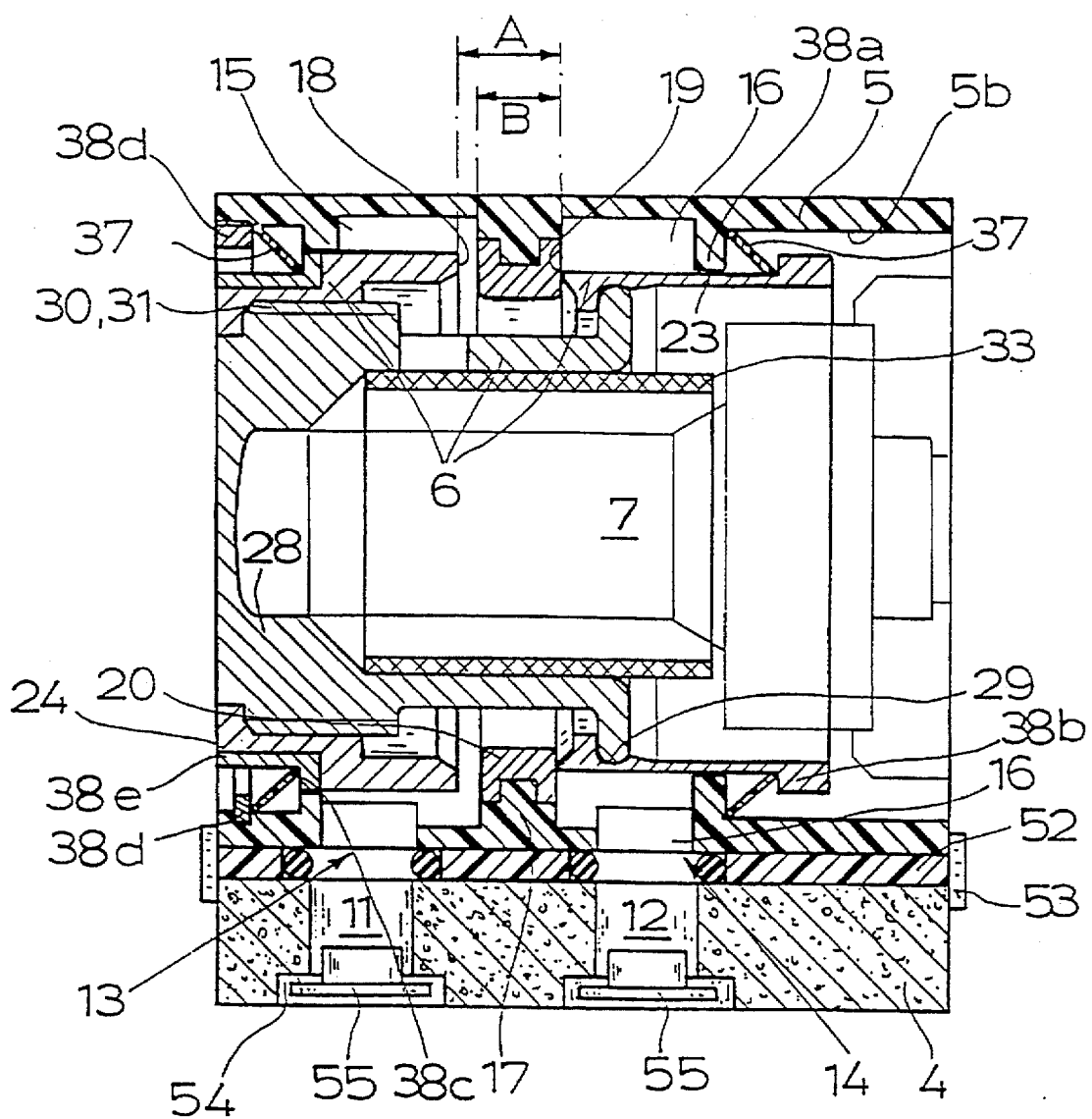

In the embodiments of a sanitary mixing faucet according to the invention shown in FIGS. 2, 4 and 5 control piston 6 consists of first piston part 23, second piston part 24, and adapter 28 which joins two piston parts 23, 24. In particular, adapter 28 on the one hand is connected by snap connection 29 to first piston part 23, on the other hand has outer thread 30 and projects with outer thread 30 into second piston part 24, that second piston part 24 is provided with inner thread 31 and two piston parts 23, 24 are screwed together. In this embodiment two piston parts 23, 24 consist of copper or brass, preferably of brass, and adapter 28 is made of plastic. For the implementation of the invention shown in FIGS. 4 and 5 however it plays no part whether the control piston has an adapter with a snap connection or a connection part which is to be screwed.

As described above, in the embodiments of a sanitary mixing faucet according to the invention shown in FIGS. 1, 2, 4 and 5 two piston parts 23, 24 of control piston 6 consist of copper or brass, preferably of brass. However, an embodiment which is not shown in the Figures is also conceivable in which the control piston consists entirely of plastic and at points which are subject to special wear, for example the cold water control edge and the hot water control edge, is provided with copper or brass reinforcement, preferably brass.

For the embodiments of a sanitary mixing faucet according to the invention shown in FIGS. 1, 2, 4 and 5 control piston 6 depending on its position relative to temperature control block 5 has openings 32 which discharge into the interior of control piston 6 and which communicate with cold water annulus 15 and/or hot water annulus 16. In this case, in the interior of control piston 6 there can be screen sleeve 33 which is shown only in FIG. 5 and which lies preferably on the inner wall, and there can be control element 7 at least partially within control piston 6, therefore in its interior.

Figure 3:
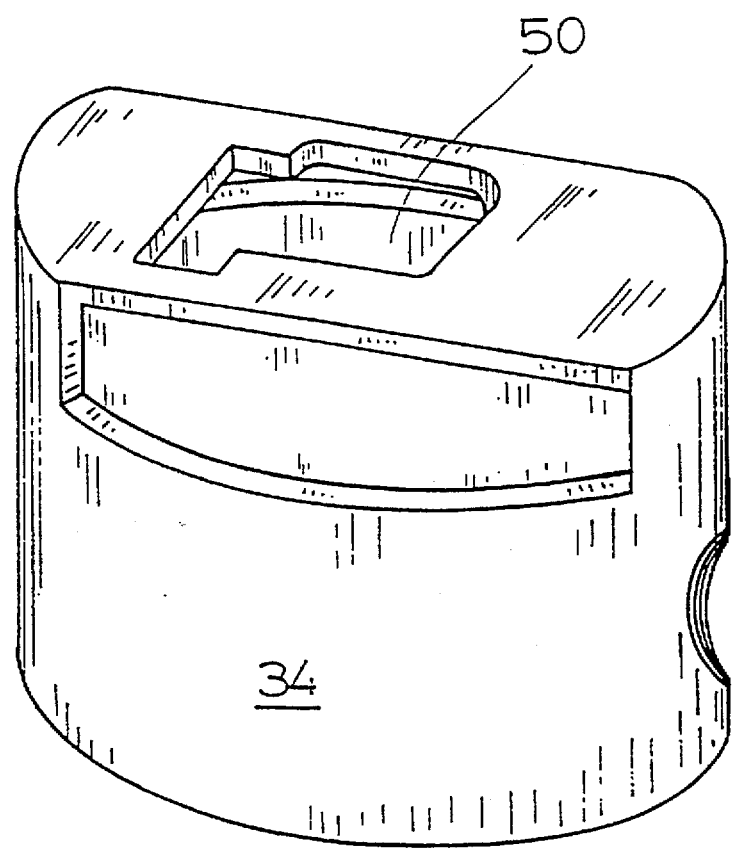
FIG. 3 shows a perspective view of a control sleeve of the sanitary mixing faucet shown in FIGS. 1 and 2, FIGS. 4 and 5 show longitudinal sections through the most important function parts of a third and a fourth embodiment of a sanitary mixing faucet according to the invention with thermostat control.

FIG. 3 shows control sleeve 34 which overlaps at least partially temperature control block 5 of the embodiments according to FIGS. 1 and 2. In the embodiments according to FIGS. 1 and 2 control piston 6 is clamped into control sleeve 34. However, it is common to all embodiments that control element 7 is clamped into control sleeve 34. In the embodiments according to FIGS. 1 and 2 control piston 6 is supported via control element 35 on first support flange 34a of control sleeve 34 and control element 7 is supported on second support flange 34b of control sleeve 34, that reset spring element 35 is executed as a helical compression spring and that the end of piston element 6 facing reset spring element 35 has annular groove 36 which holds the end of reset spring element 35, the end facing control piston 6.

The embodiments according to FIGS. 4 and 5 differ from the embodiments according to FIGS. 1 and 2 in that there is no reset spring element designed as a helical compression spring. Accordingly there is no annular groove on control piston 6 either. In the embodiment according to FIG. 4, one reset spring element 37, in the embodiment according to FIG. 5 two reset spring elements 37, are used, each reset spring element 37 on the one hand being supported on temperature control block 5, i.e., on its inner jacket, and on the other hand on control piston 6, i.e., on its outer jacket. This means that a reset spring element, as described in FIGS. 1 and 2, which is designed as a helical compression spring, can be completely abandoned.

To place or support reset spring element 37 on temperature control block 5 on the one hand and on control piston 6 on the other, on temperature control block 5 is peripheral stop 38a, while on control piston 6 is peripheral stop 38b. This applies at least to first piston part 23. In any case it is significant that in the embodiments according to FIGS. 4 and 5 reset spring element 37 seals between temperature control block 5 on the one hand and control piston 6 itself on the other, i.e., at this point no other seals are necessary. Here it goes without saying that of course between temperature control block 5 and control piston 6, next to reset spring element 37 according to the invention, another O ring, as in the embodiments according to FIGS. 1 and 2, membrane seals 21 can be provided, but not necessarily so.

Reset spring element 37 is formed as a disk spring. Furthermore, it is provided that reset spring element 37 regardless of the position of control piston 6 always acts at least with low prestress between temperature control block 5 and control piston 6; this means that even if cold water control edge 18 strikes control and stop collar 17, reset spring element 37 still has low prestress and springs against stops 38a and 38b. This ensures that reset spring element 37 in any position of control piston 6 is in sealing contact with the latter and is located on temperature control block 5. Since the peripheral edges of reset spring element 37 move along the slide surfaces in the area of stops 38a, 38b during loading and unloading, at least the areas of temperature control block 5 and control piston 6 which form the slide surfaces should consist of hardened material. For this reason it is possible to produce temperature control block 5 and control piston 6 completely of copper or brass, preferably of brass, or in the case of using plastic, to provide the corresponding inserts which form stop 38a, 38b and slide surfaces; however this is not shown.

Since in the embodiments according to FIGS. 4 and 5 no helical compression spring is used, the mount of space ordinarily necessary for this purpose and that for the support flange of the control sleeve can be completely saved. This of course means that the dimensions of the sanitary mixing faucet according to the invention can be further reduced. At the same time this means that an annular groove on control piston 6 in the embodiments according to FIGS. 4 and 5 is not necessary, and furthermore that control sleeve 34 used in the embodiments according to FIGS. 4 and 5, at least with respect to the formation of first support flange 34a, does not correspond to control sleeve 34 in the embodiments according to FIGS. 1 and 2. Control sleeve 34 can have at this point either a recess or can be accordingly narrower.

The embodiments according to FIGS. 4 and 5 furthermore differ in that in the embodiment according to FIG. 4 for second piston part 24 there are outer groove 22a and inner groove 22b with membrane seal 21, while in the embodiment according to FIG. 5 for sealing in turn reset spring element 37 is used as in first piston part 23. It goes without saying that in the embodiment according to FIG. 4 membrane seal 21 can also be located in the area of first piston part 23 and reset spring element 37 in the area of second piston part 24, for which then of course the corresponding formation of grooves and stops is necessary.

Use of reset spring element 37 formed as a disk spring presupposes that in the area of first piston part 23 there is opening 5b in temperature control block 5 with an inside diameter which corresponds roughly to the outside diameter of reset spring element 37, preferably is somewhat greater so that reset spring element 37 can be easily inserted into opening 5b until it hits stop 38a. Furthermore, it should be observed that the maximum outside diameter of first piston part 23 adjacent to stop 38b, i.e., in the direction to second piston part 24, corresponds roughly to the inside diameter of reset spring element 37, preferably is somewhat smaller. The height of stops 38a, 38b should be matched to the gap width between the cold water control edge 18 and hot water control edge 19 and control and stop collar 17 or the maximum spring path of reset spring element 37.

While reset spring element 37 is snapped together with first piston part 23 on adapter 28 and in the snapped state is under a certain prestress, in order to achieve the aforementioned sealing effect, reset spring element 37 for second piston part 24 is inserted later. In this regard it goes without saying that between second piston part 24 and temperature control block 5 an annular gap is formed with dimensions which are chosen such that unloaded reset spring element 37 can be held therein and in the loaded state strikes stop 38c on second piston part 24. In order now to ensure a stop on temperature control block 5, there are two possibilities, both shown in FIG. 5. In the upper half of FIG. 5, to form stop 38d an inner ring is chosen which has an outer thread, a corresponding inner thread being provided on temperature control block 5 so that the inner ring can be screwed into a certain position and reset spring element 37 is accordingly prestressed. In the lower half of FIG. 5 stop 38d is made as a retaining ring which is held in a corresponding groove in temperature control block 5.

Furthermore, from FIG. 5 a peripheral insert 38e is apparent which is pushed onto control piston 6 and preferably is attached to it. This insert 38e consists of hardened material and has not only stop 38c, but also a slide surface for reset spring element 37. Corresponding inserts which form the respective stop and/or the respective slide surface can also be provided in the area of stops 38a, 38b and 38c; this however is not shown.

In the embodiment which is not shown and in which the stop need not be implemented via an inner ring or retainer ring, but is formed permanently on temperature control block 5, reset spring element 37 is inserted via the opening into temperature control block 5. The other stops (and also the stop collar) can be formed via retainer rings or screw couplings in this case.

The aforementioned details show that for each disk spring executed as a reset spring element there must always be a type of stop on the control piston and a type of stop on the temperature control block. In this case the arrangement of the plate spring for structural reasons must be simpler in the area of that piston part in which the stop is on the outside on the control piston, i.e., away from the control and stop collar, and the stop on the temperature control block is on the inside, i.e., nearer the control and stop collar.

All these features and advantages of course also apply to the aforementioned embodiments which are not shown, without the control and stop collar, and to thermostat valves so that a separate explanation can be omitted here to avoid repetition. In any case it should be mentioned that the means, which radially surrounds the control piston, in a thermostat valve can be formed for example by the thermostat housing itself or a section thereof. The term "means" should be understood in each case as the generic term for the respective "article" which surrounds the control piston, both with regard to sanitary mixing faucets and also thermostat valves.

The advantage of the exclusive use of reset spring elements 37 which simultaneously act as seals, therefore eliminating the need for any additional seals—one such embodiment is shown in FIG. 5—consists in that with a suitable material choice, for example spring steel for reset spring element 37, and when using hardened slide surfaces and stops, the sealing sites according to the invention have a theoretically infinite service life. However, the construction cost, especially for implementation of stop 38d, is somewhat higher than the formation of inner groove 22a and outer groove 22b with membrane seal 21 inserted, as is shown in FIG. 4.

As FIGS. 2, 4, and 5 further show, between the end of control element 7 facing second support flange 34b of control sleeve 3 and second support flange 34b of control sleeve 34 there is a residual path unit 39 which allows spring-loaded movement of the end of control element 7, the end facing second support flange 34b of control sleeve 34, relative to second support flange 34b of control sleeve 34. In particular residual path unit 39 consists of outer sleeve 40 joined to second support flange 34b of control sleeve 34, inner sleeve 42 which has support surface 41 for control element 7, and residual path spring 45 which is provided between inner collar 43 of outer sleeve 40 and outer collar 44 of inner sleeve 42. In this case second support flange 34b of control sleeve 34 has threaded opening 46 which is used to hold residual path unit 39, outer sleeve 40 of residual path unit 39 is provided with outside thread 47 and residual path unit 39 is screwed with outside thread 47 of outer sleeve 40 into threaded opening 46 of second support flange 34b of control sleeve 34.

Preferably outer sleeve 40 and inner sleeve 42 of above described residual path unit 39 consists of plastic. In this case, as is not described in detail, outer sleeve 40 of residual path unit 39 can have at least one snap projection which projects to the inside and inner sleeve 42 is provided with at least one spring slot which divides its outer collar.

In the embodiments of a sanitary mixing faucet according to the invention shown in FIGS. 1, 2, 4 and 5 control sleeve 34 can move on the one hand with temperature control block 5 and on the other hand relative to temperature control block 5. To do this temperature control block 5 is provided with control head 48, in control head 48 cam 49 is pivotally mounted, control sleeve 34 has control recess 50 and control sleeve 34 can move by interaction of cam 49 and control recess 50 on the one hand with temperature control block 5 and on the other relative to temperature control block 5. Cam 49 has control recess 51 into which control lever 8 joined with the actuating lever which is not shown fits.

Furthermore, especially FIG. 5 shows additional advantageous measures in conjunction with the sanitary mixing faucet according to the invention. Valve washer 4 is connected via connecting plate 52 to temperature control block 5, connecting plate 52 having on the one hand valve washer 4 and projections 53 which on the other overlap temperature control block 5. Furthermore, FIG. 5 shows that through openings 11, 12 which are made in valve washer 4 are provided on the side facing valve face washer 3 with expansion 54 and that in through openings 11, 12 which are made in valve washer 4 there is one screen insert 55 each on the side facing valve face washer 3.

It is not shown in the figures that in the sanitary mixing faucet according to the invention the valve washer and the temperature control block can be made one piece, then the through openings coinciding in the valve face washer with the cold water inlet opening and hot water inlet opening in the temperature control block. However preferably, as is shown in the figures the valve disk on the one hand and the temperature control block on the other hand are made as separate parts since only then is it possible to use materials optimum in terms of cost and function for the two parts.

Furthermore it is not shown in the figures that in the sanitary mixing faucets according to the invention the temperature control block can be made in one piece with the control head and the connecting plate; this is more cost favorable than the implementation of separate parts. This integral design can consist of copper or brass, preferably, again for cost reasons, however, of plastic.

FIG. 6 shows a longitudinal section of another embodiment of the mixing faucet according to the invention with thermostat control, shown cut out. In this case for reasons of clarity a host of function parts are not shown. The part of the sanitary mixing faucet according to the invention shown in FIG. 6 is intended simply to illustrate the aforementioned principle according to the invention in which there is no control and stop collar and instead external edges 17a and 17b are provided, with a distance from one another which is greater than the longitudinal extension of control piston 6. FIG. 6 in the upper and lower part each shows different embodiments which are detailed below. The difference between the two embodiments shown in FIG. 6 consists in that in the embodiment shown in the lower part of FIG. 6 with a corresponding adjustment cold water control edge 18 can strike edge 17a and hot water control edge 19 can strike edge 17b, while in the embodiment shown in the upper part of FIG. 6 control piston 6 can move beyond respective edge 17a or 17b with its cold water control edge 18 or its hot water control edge 19. This of course presupposes that in these positions a corresponding seal is ensured between the inner jacket of temperature control block 5 and the outer jacket of control piston 6.

In the embodiments shown in FIG. 6 only a single reset spring element 37 is necessary which performs resetting of control piston 6 and at the same time seals between control piston 6 and temperature control block 5. Reset spring element 37 has at least in the prestressed state in the radial direction a roughly S-shaped section which is not detailed. This S-shaped section keeps control piston 6 in the state inserted into temperature control block 5 under tension and ensures in an especially advantageous manner that gap 56 which is formed between the outer jacket of control piston 6 and the inner jacket of temperature control block 5 can be made relatively large. Gap 56 of this size prevents calcification of the mixing faucet according to the invention. It should be pointed out here that the corresponding gaps in the embodiments of FIGS. 1, 2 4 and 5 and the embodiments which are not mentioned are likewise made correspondingly large even if this is not detailed in particular.

FIG. 7 shows annular reset spring element 37 which is used as a membrane seal and also as a reset element with its S-shaped section according to the embodiment from FIG. 6. Obviously reset spring element 37 in the unloaded state also has an S-shaped section.

FIGS. 8 and 9 show another embodiment of reset spring element 37 according to the invention. FIG. 8 shows that reset spring element 37 has spring 37a which is roughly loop or meander-shaped in the peripheral direction. Based on this special configuration of spring 37a outer sheath 37b which surrounds spring 37a is necessary; it preferably consists of plastic or elastomer and is made ring-shaped. By means of the special formation of reset spring element 37 with spring 37a and outer sheath 37b the flexibility of reset spring element 37 can be adjusted in wide limits.

It goes without saying that embodiments of reset spring element 37 according to the invention which are shown in FIGS. 6 through 9 can of course also be used in the embodiments shown in FIGS. 1, 2, 4 and 5 and also those not shown. In addition the reset spring element shown in FIGS. 8 and 9 can have a roughly S-shape according to the execution according to FIGS. 6 and 7.

I claim:

1. Sanitary mixing faucet with thermostat control, with cold water supply (1), hot water supply (2), and a mixed water discharge, with a means which radially surrounds control piston (6), preferably temperature control block (5), with temperature-dependent control element (7) which interacts with control piston (6), with an actuating lever and with reset spring element (37) which loads control piston (6) in the direction to control element (7), cold water annulus (15) and adjacent hot water annulus (16) being provided and control piston (6) being adjustable for temperature control relative to temperature control block (5) into a temperature-determining neutral position and being controllable for temperature control by means of control element (7), wherein reset spring element (37) is located between temperature control block (5) and control piston (6), and on the one hand, is supported on temperature control block (5), preferably on an inner jacket of the control piston, and on the other hand, on an outer jacket of control piston (6).

2. Sanitary mixing faucet according claim 1, wherein there is one stop (38a, 38b) each for reset spring element (37) on temperature control block (5) and on the outer jacket of control piston (6).

3. Sanitary mixing faucet according claim 1, wherein spring reset element (37) seals between temperature control block (5) and control piston (6).

4. Sanitary mixing faucet according to claim 3, wherein reset spring element (37) seals between cold water annulus (15) and hot water annulus (16) or seals cold water annulus (15) and/or hot water annulus (16) each to the outside and wherein preferably there are no further seals between temperature control block (5) and control piston (6).

5. Sanitary mixing faucet according to claim 1, wherein spring reset element (37) regardless of the position of control piston (6) always acts at least with low prestress between temperature control block (5) and control piston (6).

6. Sanitary mixing faucet according to claim 1, wherein reset spring element (37) is made as a disk spring.

7. Sanitary mixing faucet according claim 6, wherein there are slide surfaces for reset spring element (37) which consist of hardened metal on temperature control block (5) and/or control piston (6).

8. Sanitary mixing faucet according claim 6, wherein there is at least one insert of hardened material on temperature control block (5) and/or control piston (6) and stop (38a, 38b) and the slide surfaces are formed on the insert.

9. Sanitary mixing faucet according to claim 1, wherein reset spring element (37) at least in the prestressed state in the radial direction has a roughly S-shaped section.

10. Sanitary mixing faucet according to claim 1, wherein reset spring element (37) has spring (37a) with a loop or meander shape in the peripheral direction.

11. Sanitary mixing faucet according to claim 1, wherein reset spring element (37) has outer sheath (37b) preferably of plastic or elastomer.

12. Sanitary mixing faucet according claim 1, with stationary valve face washer (3), with valve washer (4) which can move on valve face washer (3) for quantitative control, and with control lever (8) which is connected to an actuating lever, valve face washer (3) having cold water inlet opening (9) which is connected to cold water supply (1) and hot water inlet opening (10) which is connected to hot water supply (2), valve washer (4) having openings (11, 12) which communicate with cold water inlet opening (9) of valve face washer (3) and hot water inlet opening (10) of valve face washer (3), temperature control block (5) having cold and hot water inlet openings (13, 14) which communicate with openings (11, 12) of valve washer (4) and valve washer (4) for temperature control interacting with temperature control block (5), wherein temperature control block (5) between cold water annulus (15) and hot water annulus (16) has control and stop collar (17), control piston (6) is made sleeve-shaped and has cold water control edge (18) and hot water control edge (19) with distance (A) to cold water control edge (18) and control and stop collar (17) has width (B) which is less than distance (A) between cold water control edge (18) and hot water control edge (19), and projects into the intermediate space between cold water control edge (18) and hot water control edge (19).

13. Sanitary mixing faucet according to claim 1, wherein the mixing faucet is built as a single lever mixing faucet.

14. Thermostat valve with a control piston, with a temperature control means which radially surrounds the control piston, with a temperature-dependent control element which interacts with the control piston, with an actuating element and with a reset spring element which loads the control piston in the direction to the control element, the control piston being adjustable for temperature control relative to the temperature control means into a temperature-determining neutral position and being controllable for temperature control by means of the control element, wherein the reset spring element is located between the temperature control means and the control piston, and on the one hand, is supported on the temperature control means, preferably on an inner jacket of the control piston, and on the other hand, on an outer jacket of the control piston.

15. Thermostat valve, especially according to claim 11, with a cold water supply, a hot water supply, and a mixed water discharge, a cold water annulus and an adjacent hot water annulus being provided, wherein there is at least one annular membrane seal between the temperature control means and the control piston and the membrane seal seals either between the cold water annulus and the hot water annulus or seals the cold water annulus and/or the hot water annulus to the outside.

16. Thermostat valve according to claim 11 or 12, wherein the temperature control means is executed as a section of the thermostat control piston housing which radially surrounds the control piston.

* * * * *